(12) United States Patent
Yoon et al.

(10) Patent No.: US 10,324,440 B2
(45) Date of Patent: Jun. 18, 2019

(54) PROGRAMMABLE LOGIC CONTROLLER SYSTEM

(71) Applicant: LSIS CO., LTD., Gyeonggi-do (KR)

(72) Inventors: Geon Yoon, Gyeonggi-do (KR); Ki-Myung Kim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 410 days.

(21) Appl. No.: 15/188,897

(22) Filed: Jun. 21, 2016

(65) Prior Publication Data

US 2016/0370783 A1 Dec. 22, 2016

(30) Foreign Application Priority Data

Jun. 22, 2015 (KR) .................. 10-2015-0088339

(51) Int. Cl.
G05B 19/05 (2006.01)
H04L 29/08 (2006.01)

(52) U.S. Cl.
CPC ......... *G05B 19/052* (2013.01); *G05B 19/056* (2013.01); *H04L 69/324* (2013.01); *G05B 2219/1205* (2013.01); *G05B 2219/15112* (2013.01); *G05B 2219/2639* (2013.01)

(58) Field of Classification Search
None
See application file for complete search history.

(56) References Cited

U.S. PATENT DOCUMENTS

| 2002/0046221 | A1 | 4/2002 | Wallace et al. |
| 2009/0129395 | A1 | 5/2009 | Janssen et al. |
| 2010/0165878 | A1 | 7/2010 | Soni |
| 2014/0074256 | A1* | 3/2014 | Okamura ............ G05B 19/042 700/83 |

FOREIGN PATENT DOCUMENTS

| CN | 1477468 A | 2/2004 |
| CN | 1953556 A | 4/2007 |

(Continued)

OTHER PUBLICATIONS

Japanese Office Action dated May 16, 2017 in connection with the counterpart Japanese Patent Application.

(Continued)

*Primary Examiner* — Robert K Carpenter
(74) *Attorney, Agent, or Firm* — K&L Gates LLP

(57) ABSTRACT

In some embodiments, a PLC system including a first CPU comprising a first media access control (MAC) communications layer and configured to generate data necessary for operation of the CPU, perform control operation based on the generated data, and transmit the generated data to a second CPU via the first MAC communications layer is included. The PLC system may further include the second CPU comprising a second MAC communications layer receiving the generated data via the first MAC communications layer and configured to perform service operation based on the received data. The first CPU may be connected to a memory in which data to be transmitted to the second CPU is stored at a predetermined location, and the second CPU may receive the data stored in the predetermined location of the memory by a direct memory access (DMA) scheme.

6 Claims, 9 Drawing Sheets

(56) References Cited

FOREIGN PATENT DOCUMENTS

| | | | |
|---|---|---|---|
| CN | 101308536 | A | 11/2008 |
| CN | 101692172 | A | 4/2010 |
| CN | 201520044 | U | 7/2010 |
| CN | 103995499 | A | 8/2014 |
| EP | 2767906 | A1 | 8/2014 |
| JP | 2002-63060 | A | 2/2002 |
| JP | 2002-353960 | A | 12/2002 |
| JP | 2005-141699 | A | 6/2005 |
| JP | 2010-257193 | A | 11/2010 |
| JP | 2013-161106 | A | 8/2013 |
| JP | 2014-157506 | A | 8/2014 |
| KR | 10-0378372 | B1 | 3/2003 |
| KR | 10-2010-0039666 | A | 4/2010 |
| WO | 2015/068382 | A1 | 5/2015 |

OTHER PUBLICATIONS

Korean Office Action dated Apr. 19, 2017 in connection with the counterpart Korean Patent Application.
European Search Report dated Nov. 17, 2016 corresponding to application No. 16172059.4-1802.
Chinese Office Action for related Chinese Application No. 201610458216.1; action dated May 2, 2018; (6 pages).
Japanese Notice of Allowance for related Japanese Application No. 2016-122579; action dated Nov. 7, 2017; (3 pages).

* cited by examiner

PROGRAMMABLE LOGIC CONTROLLER SYSTEM

CROSS REFERENCE TO RELATED APPLICATIONS

This application claims the benefit of Korean Patent Application No. 10-2015-0088339, filed on Jun. 22, 2015, entitled "PROGRAMMABLE LOGIC CONTROLLER SYSTEM", which is hereby incorporated by reference in its entirety.

BACKGROUND

Technical Field

The present disclosure relates to a programmable logic controller (PLC) system, and more specifically to central processing units (CPUs) of a PLC system.

Description of the Related Art

The demand for electric power increases with industrial development, and power use greatly differs between day and night, between seasons and between weekdays and holidays, the load factor becomes lower seriously.

Recently, to address such an issue, a variety of load management technologies for reducing peak load by utilizing excessive power is being developed. The battery energy storage system is one of the technologies.

The battery energy storage system stores excessive power at night or power generated from wind power, solar power, etc., and supplies the stored power to a load when the load reaches the peak or when an accident takes place in the system.

In this manner, it is possible to reduce the peak load and level the load.

Recently, smart grids attract attention as a variety of new and renewable energy sources are developed. Smart grids may also employ the battery power storage system.

Such a battery power storage system employs a control system using a PLC. The control system becomes more sophisticated and faster day by day and requires many additional functions in conjunction with IT technology.

In order to perform precise control, the operation of the PLC has to be predictable. However, as a number of IT technologies are combined, the CPU of the PLC has large load, which makes the operation of the PLC unpredictable.

To relieve such load, the CPU of the PLC is divided into a main CPU responsible for control function and a sub-CPU responsible for other function, such that the control operation of the PLC can be performed more easily.

Unfortunately, to operate such dual-CPU including the main CPU and the sub-CPU, an expensive dual-port RAM is required for sharing data between the main CPU and the sub-CPU. In addition, there is a problem in that delay time takes for sharing data between the two CPUs.

SUMMARY

It is an object of some embodiments of the present disclosure to solve the above-mentioned and other problems. It is another object of some embodiments of the present disclosure to provide a PLC system using two CPUs.

In accordance with one aspect of some embodiments of the present disclosure, a programmable logic controller (PLC) system using two CPUs includes: a first CPU comprising a first media access control (MAC) communications layer and configured to generate data necessary for operation of the CPU, perform control operation based on the generated data, and transmit the generated data to a second CPU via the first MAC communications layer; and the second CPU comprising a second MAC communications layer receiving the generated data via the first MAC communications layer and configured to perform service operation based on the received data. The first CPU is connected to a memory in which data to be transmitted to the second CPU is stored at a predetermined location, and the second CPU receives the data stored in the predetermined location of the memory by a direct memory access (DMA) scheme.

DETAILED DESCRIPTION

Figure 1:
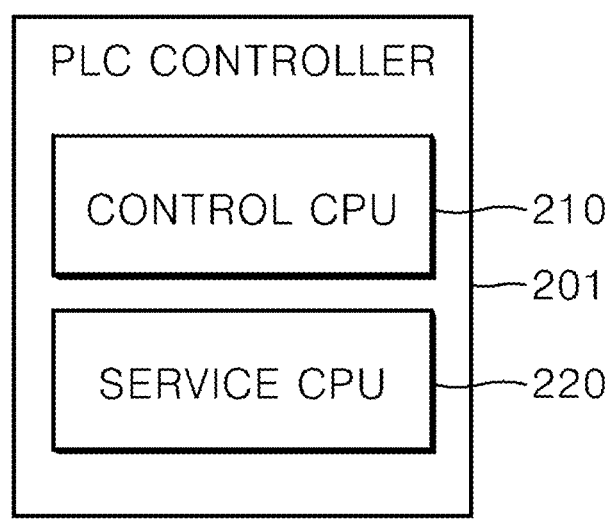
FIG. 1 is a block diagram of a PLC controller according to an embodiment of the present disclosure.

Embodiments of the present disclosure will now be described in detail with reference to the accompanying drawings. However, it should be noted that the scope of the present disclosure is not limited to the embodiments set forth herein and those skilled in the art would easily accomplish retrogressive disclosures or other embodiments that fall within the scope of the present disclosure by adding, modifying and eliminating elements.

In describing the present disclosure, descriptions on well-known technologies may be omitted in order not to obscure the gist of the present disclosure. It will be understood that, although the terms first, second, etc. may be used herein to describe various elements, these elements should not be limited by these terms. These terms are only used to distinguish one element from another.

The terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It is to be noticed that the term "comprising", used in the present description and claims, should not be interpreted as being restricted to the means listed thereafter; it does not exclude other elements or steps.

Hereinafter, embodiments of the present disclosure will be described in detail with reference to the accompanying drawings. Throughout the specification, like reference numerals in the drawings denote like elements.

Hereinafter, the configuration and operation of a PLC controller 201 according to an embodiment of the present disclosure will be described with reference to FIGS. 1 to 3.

FIG. 1 is a block diagram of a PLC controller according to an embodiment of the present disclosure.

Referring to FIG. 1, the PLC controller 201 may include a control CPU 210 and a service CPU 220.

The control CPU 210 may perform control operation on a system at a lower hierarchical level such as time synchronization control operation even while the PLC controller 201 is being operated. The service CPU 220 may include all kinds of operations except the control operation, such as control operation on IT service even while the PLC controller 210 is being operated.

More specifically, the control CPU 210 may perform control operation while the PLC controller 201 is being operated, and the service CPU 220 may perform all kinds of operations except the control operation while the PLC controller 201 is being operated.

That is, the control CPU 210 and the service CPU 220 may be configured as separate elements in the PLC controller 210 and may perform their own operations independently.

The control CPU 210 may perform control operation on a lower hierarchical level such as time synchronization control operation, and the service CPU 220 performs the rest of the operations except the control operation. Accordingly, there is an advantage in that the control operation of the PLC controller 201 can be performed stably without being externally affected, e.g., without being interrupted.

Figure 2:
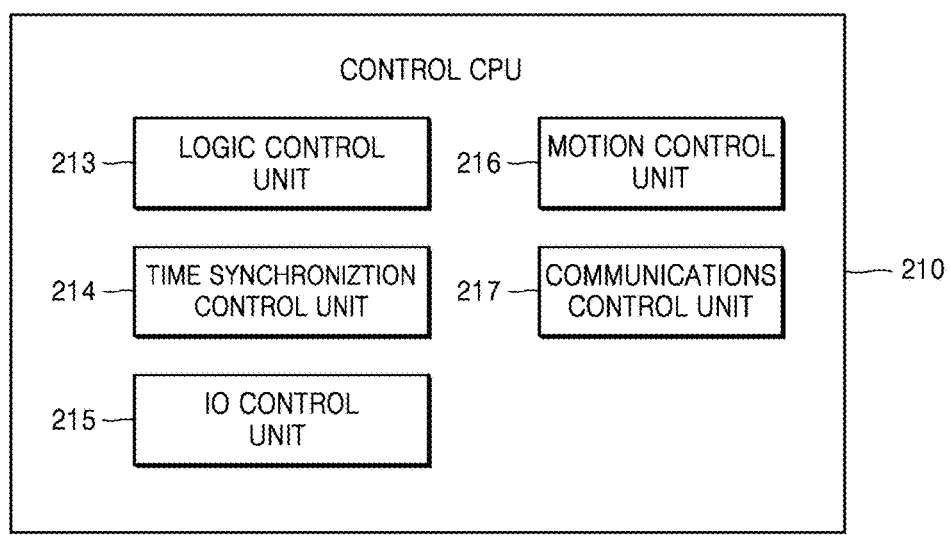
FIG. 2 is a block diagram of the control CPU according to an embodiment of the present disclosure.

FIG. 2 is a block diagram of the control CPU according to an embodiment of the present disclosure.

As shown in FIG. 2, the control CPU 210 may include a logic control unit 213, a time synchronization control unit 214, an input/output (IO) control unit 215, a motion control unit 216 and a communications control unit 217 depending on the operations they perform.

In the control CPU 210, the logic control unit 213 performs logic stored in advance. The time synchronization control unit 214 synchronizes time that is used as a reference for controlling a PCS module or a battery module in a lower hierarchical level. The IO control unit 215 may control input operation to the PLC controller 201, e.g., instruction input via a HMI and output operation from the PLC controller 201, e.g., event alarm output.

The motion control unit 216 may control motions or specific operations of facilities such as the battery module operating in response to the control instruction from the PLC controller 201. The communications control unit 217 may control data exchange between the PLC controller 201 and a system in a lower or higher hierarchical level, e.g., a BMS or an EMS, respectively.

Figure 3:
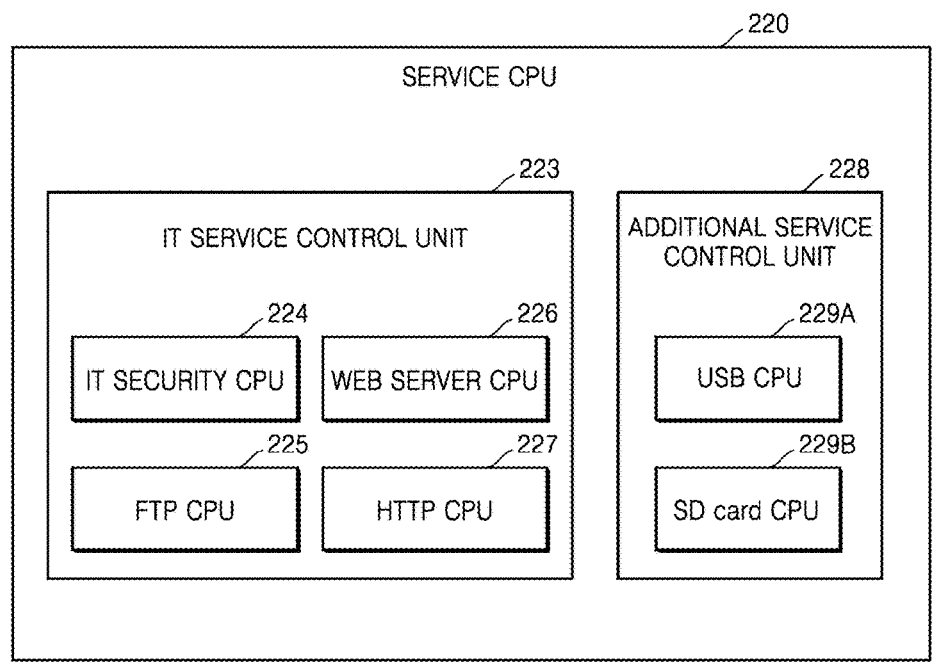
FIG. 3 is a block diagram of the service CPU according to an embodiment of the present disclosure.

FIG. 3 is a block diagram of the service CPU according to an embodiment of the present disclosure.

As shown in FIG. 3, the service CPU 220 may include an IT service control unit 223 and an additional service control unit 228 depending on the type of services they provide.

The IT service control unit 223 may perform operation on IT (Internet technology) among the operations in the PLC controller 201, such as control on a web-server. The additional service control unit 228 may recognize an external device connected to the PLC controller 201, e.g., a universal serial bus (USB).

The IT service control unit 223 may include an IT security control unit 224, a web-server control unit 226, a FTP control unit 225 and a HTTP control unit 227 and may perform operations on IT services.

The IT security control unit 224 may perform control operations on the security service at the time of providing IT service. The web-server control unit 226 may perform operations for controlling a web-server (not shown) connected to the PLC controller 201. The FTP control unit 225 and the HTTP control unit 227 may control Internet connection operation via the file transfer protocol (FTP) and the hyper terminal transfer protocol (HTTP), respectively.

The additional service control unit 228 may include a USB control unit 229A performing control operation on a USB device connected via a USB port, and an SD card control unit 229B performing control operation on an SD card device.

Hereinafter, the ways how the control CPU and the service CPU in the PLC controller share data therebetween will be described with reference to FIGS. 4 to 6.

Figure 4:
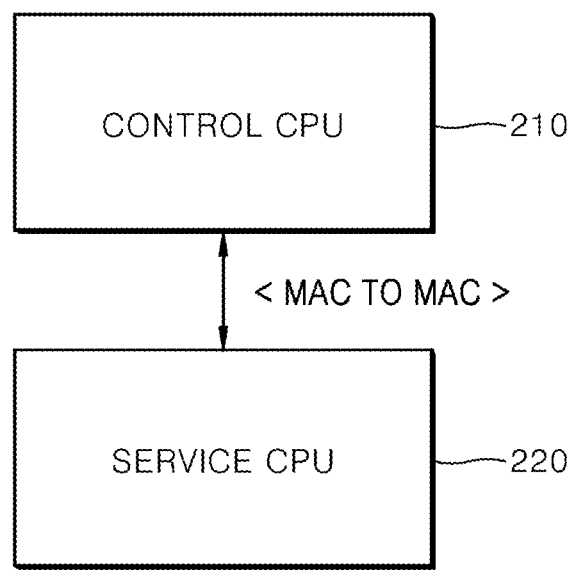
FIG. 4 is a block diagram for illustrating data exchange operation between the control CPU and the service CPU according to an embodiment of the present disclosure.

FIG. 4 is a block diagram for illustrating data exchange operation between the control CPU and the service CPU according to an embodiment of the present disclosure.

As shown in FIG. 4, the control CPU 210 and the service CPU 220 are configured as separate elements in the PLC controller 201.

More specifically, the control CPU 210 configured to perform the control operation of the PLC controller 201 is separated from the service CPU 220 configured to perform the rest of the operations except the control operation.

It is to be noted that such configuration in which the control CPU is separated from the service CPU is not limited to the configuration of the PLC controller.

In this configuration, when an external interruption is issued, the control CPU 210 in the PLC controller 201 is not affected by it and continues to perform the control operation.

Referring to FIG. 4, the control CPU 210 and the service CPU 220 may be configured to exchange data according to a MAC-to-MAC communications scheme.

The MAC-to-MAC communications may refer to data exchange scheme between MAC layers. A MAC unit may be disposed in each of the control CPU 210 and the service CPU 220, which will be described in detail with reference to FIG. 5.

Figure 5:
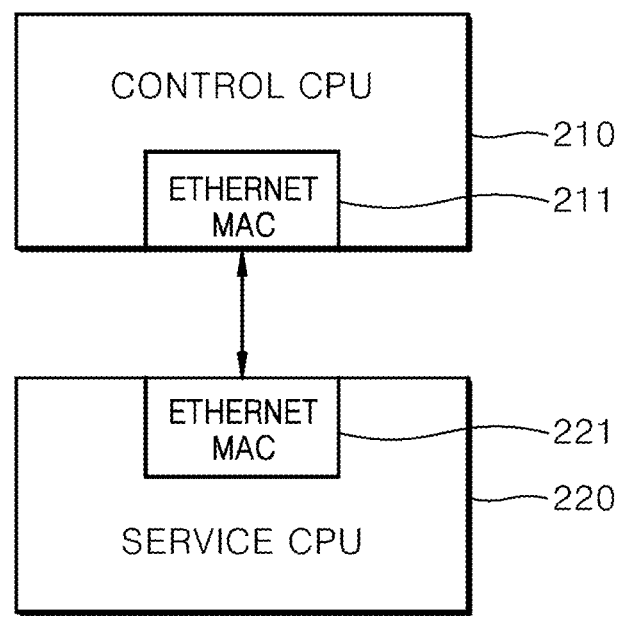
FIG. 5 is a block diagram for illustrating data exchange operation between the control CPU and the service CPU via Ethernet MAC according to an embodiment of the present disclosure.

FIG. 5 is a block diagram for illustrating data exchange operation between the control CPU and the service CPU via Ethernet MAC according to an embodiment of the present disclosure. FIG. 6 is a block diagram for illustrating data exchange operation among the control CPU, the service CPU and a plurality of memories according to an embodiment of the present disclosure.

Figure 6:
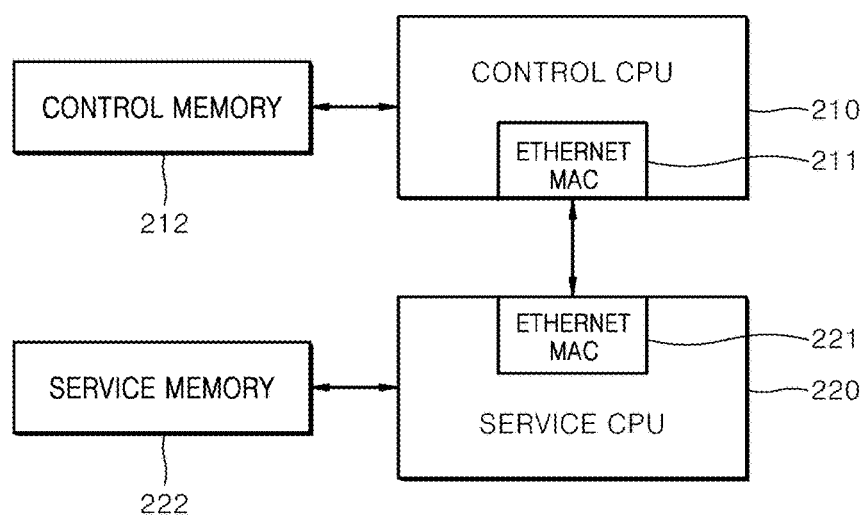
FIG. 6 is a block diagram for illustrating data exchange operation among the control CPU, the service CPU and a plurality of memories according to an embodiment of the present disclosure.

Referring to FIGS. 5 and 6, the control CPU 210 and the service CPU 220 may include Ethernet MAC units 211 and 211, respectively. A control memory 212 may be connected to the control CPU 210, and a service memory 222 may be connected to the service CPU 220.

The control CPU 210 may transmit/receive data to/from the service CPU 220 via the Ethernet MAC units 211 and

221. The control CPU 210 and the service CPU 220 may perform bi-directional communications simultaneously by using a full-duplex communications scheme via the Ethernet MAC units 211 and 221.

In the related art, the control CPU and the service CPU perform DPRM communications, such that they cannot communicated with each other simultaneously and only one of them can perform write or read operation. Accordingly, the validity of the data cannot be corrected by read/write operation of data performed by each of the operations, requiring more data process time.

In contrast, according to the embodiment of the present disclosure, the control CPU 210 and the service CPU 220 perform bi-directional communications via the Ethernet MAC units 211 and 221, and thus there may be no congestion in processing data.

Further, the control memory 212 connected to the control CPU 210 and the service memory 222 connected to the 212 may load the data processed by the control CPU 210 and the service CPU 220 at a desired location when the data is processed by using the bi-directional communications. Specifically, the control CPU 210 and the service CPU 220 may store the data transmitted/received via the bi-directional communications at predetermined addresses. Namely, no additional memory, e.g., DPRM (dual-port RAM), is required between the control CPU 210 and the service CPU 220. Accordingly, the control CPU 210 including the Ethernet MAC unit 211 may exchange data with the service CPU 220 via a dedicated DMA (direct memory access) scheme.

The DMA access scheme allows all of the devices including the control CPU 210 to access a memory to read/write data from/to it.

According to the embodiment of the present disclosure, the control CPU 210 may acquire necessary data from the service memory 222 via the DAM scheme. Likewise, the service CPU 220 may also acquire necessary data from the control memory 212 via the DAM scheme.

For example, the control memory 212 connected to the control CPU 210 may store the data received or processed by the control CPU 210 at the corresponding address. In addition, the control memory 212 may temporarily store the data that is processed by the control CPU 210 to be transmitted to the service CPU 220.

The service memory 222 connected to the service CPU 220 may store the data received or processed by the service CPU 220 at the corresponding address. In addition, the service memory 222 may temporarily store the data that is processed by the service CPU 220 to be transmitted to the control CPU 210.

The Ethernet MAC units 211 and 221 may have a data exchange rate from 100 Mbps to 10 Gbps. The above rate is not limiting but may vary depending on the performance of the MAC units.

Further, the control CPU 210 may include an Ethernet controller module that receives data via the Ethernet MAC unit 211.

Hereinafter, the ways how a control CPU, a service CPU and a security CPU in the PLC controller share data thereamong will be described with reference to FIG. 7.

Figure 7:
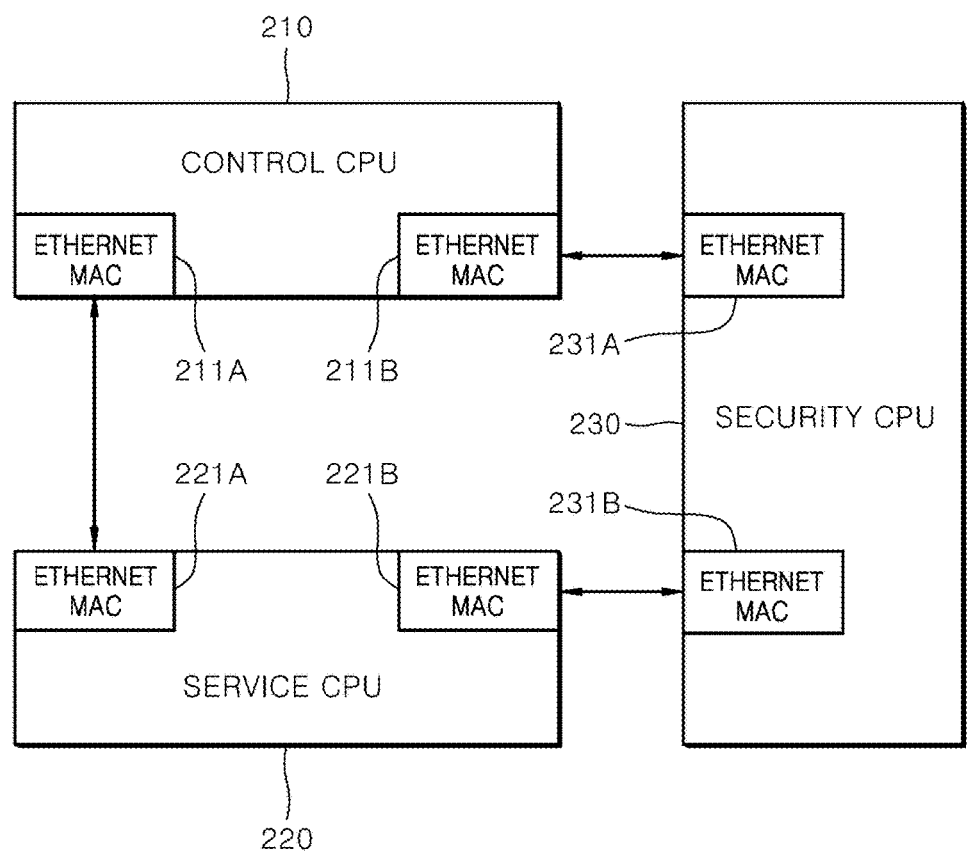
FIG. 7 is a block diagram for illustrating a control CPU, a service CPU and a security CPU and data exchange operation among the CPUs according to an embodiment of the present disclosure.

FIG. 7 is a block diagram for illustrating a control CPU, a service CPU and a security CPU and data exchange operation among the CPUs according to an embodiment of the present disclosure.

Referring to FIG. 7, the PLC controller 201 may further include the security CPU 230 performing operations associated with security in the PLC controller 201, in addition to the control CPU 210 and the service CPU 220.

As shown in FIG. 7, each of the control CPU 210, the service CPU 220 and the security CPU 230 may include two Ethernet MAC units 211A and 211B, 221A and 221B, and 231A and 231B, respectively. However, the configuration of the Ethernet MAC units is not limited to that shown in FIG. 7.

As shown in FIG. 7, the PLC controller 201 includes separate CPUs each performing their own services or functions as separate elements, so that even when one of the CPUs is interrupted, the rest of the CPUs can normally operate.

As shown in FIG. 7, the control CPU 210 may receive necessary data from the service CPU 220 or the security CPU 230 by using the Ethernet MAC units 211A and 211B, 221A and 221B, and 231A and 231B.

Hereinafter, the configuration of an energy storage system according to another embodiment of the present disclosure will be described with reference to FIG. 8.

Figure 8:
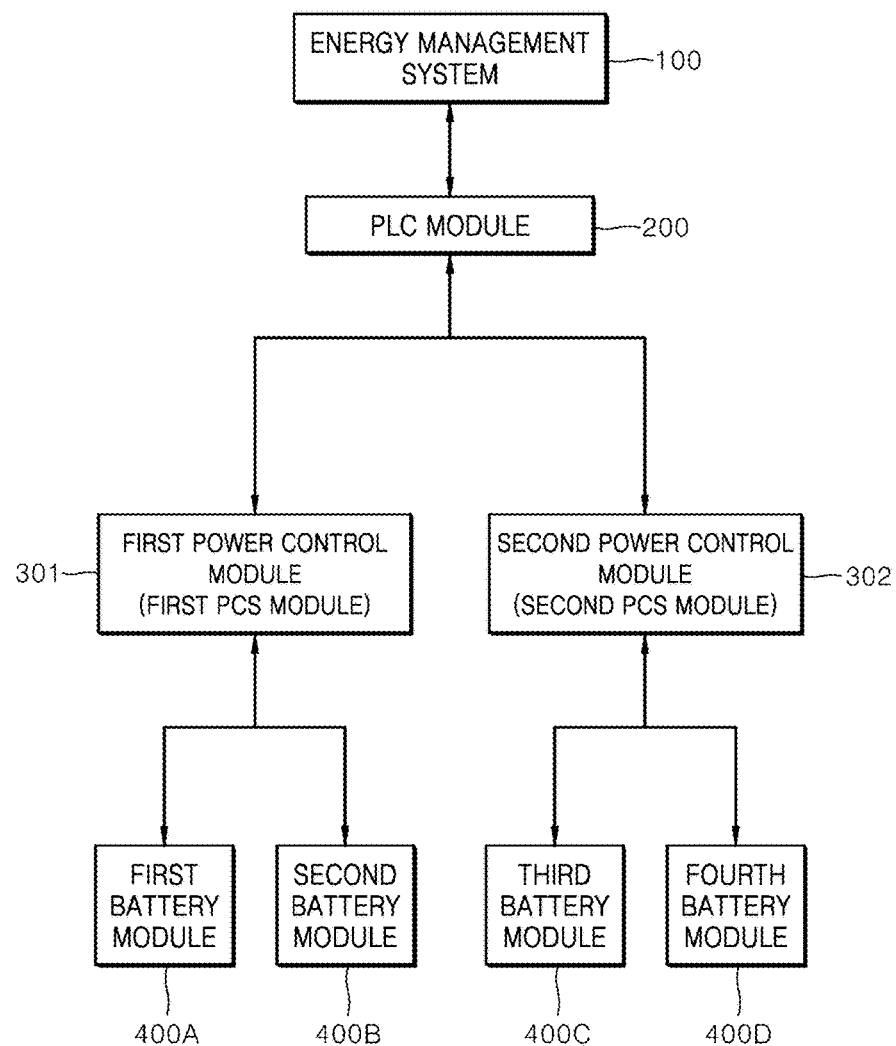
FIG. 8 is a block diagram of an energy storage system according to another embodiment of the present disclosure.

FIG. 8 is a block diagram of an energy storage system according to another embodiment of the present disclosure.

As shown in FIG. 8, the energy storage system may include an energy management system (EMS) 100, a PLC module 200, a plurality of power control module (PCS modules) 301 and 302, and a plurality of battery modules 400A, 400B, 400C and 400D.

The energy management system 100 may include a control instruction from a system at an upper hierarchical level (not shown) connected to the energy storage system.

Upon receiving the control instruction, the energy management system 100 may create a control instruction to be transmitted to a lower hierarchical level determined as target managed by the energy management system 100 in advance, such as the PLC module, the power control module and the battery module.

Once the control instruction to be transmitted to the lower hierarchical level such as the PLC module, the power control module and the battery module, is created, the energy management system 100 may transmit the control instruction to the PLC module 200, which will be described in detail later.

The PLC module 200 may receive the control instruction from the energy management system 100.

The PLC module 300 may receive the control instruction and may create control instructions to be transmitted to the plurality of power control modules 301 and 301 determined as targets managed by the PLC module, based on the control instruction.

Once the control instructions to be transmitted to the plurality of power control modules 301 and 302, the PLC module 300 may transistor the created control instructions to the plurality of power control modules 301 and 302.

The PLC module 200 may control at least two power control modules and may receive status information on a lower hierarchical level (e.g., battery charge status in percentage) from the at least two power control modules.

As the PLC module 200 is employed as the element controlling the PCS modules 301 and 302, there may be complicated sequences corresponding to situations for a large energy storage system. In this regard, the PLC module 200 may process an operation for converting such complicated sequences possibly occurring in the energy storage system into a system program to allow a user or an operator to easily manipulate.

Since at least two power control modules are controlled by the single PLC module 200, cost can be saved.

In addition, only a defective element can be separated and replaced, and thus the PLC module 200 can be operated stably and efficiently. In addition, a Master-k program, for example, may be installed in the PLC module 200, such that a user may operate the PLC module 200 while the Master-k program is running.

The PCS modules 301 and 302 may receive status information on the battery modules 400A, 400B, 400C and 400D in a lower hierarchical level therefrom.

Examples of the status information on the battery modules may include, but is not limited to, battery charge status information included in the respective battery modules. This will be described in detail later.

Upon receiving the status information on the battery modules 400A, 400B, 400C and 400D in the lower hierarchical level therefrom, the PCS modules 301 and 302 may transmit the received status information on the battery modules to the PLC module 200.

In addition, the PCS modules 301 and 302 may receive control instructions from the PLC module in an upper hierarchical level.

Upon receiving the control instructions from the PLC module 200 in the higher hierarchical level, the PCS modules 301 and 302 may create a plurality of control instructions to be transmitted to the plurality of battery modules 400A, 400B, 400C and 400D in the lower hierarchical level. The PCS modules 301 and 302 may transmit the control instructions to the battery modules 400A, 400B, 400C and 400D based on the control instruction received from the PLC module 200 in the upper hierarchical level.

Each of the plurality of battery modules (first to fourth battery modules) 400A, 400B, 400C and 400D may include a battery (not shown).

Each of the plurality of battery modules (first to fourth battery modules) 400A, 400B, 400C and 400D may create battery status information on the battery included therein.

Once the battery information is created, transmit the created battery status information to the PCS modules 301 and 302 in the upper hierarchical level.

The battery status information may contain, but is not limited to, information on the battery charge status in percentage and cell information of the batteries.

Hereinafter, the configuration of a method of operating the PLC module in the energy storage system will be described with reference to FIG. 9.

Figure 9:
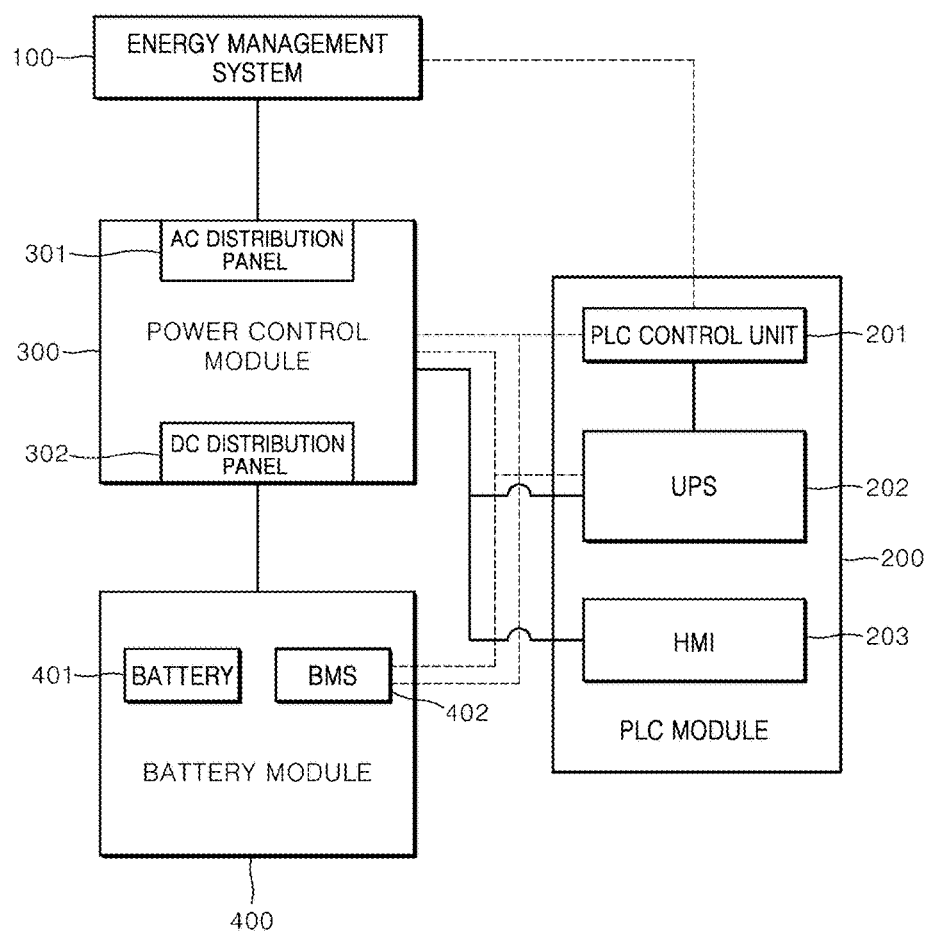
FIG. 9 is a block diagram of the PLC module and elements in the energy storage system according to an embodiment of the present disclosure.

FIG. 9 is a block diagram of the PLC module and elements in the energy storage system according to yet another embodiment of the present disclosure.

Referring to FIG. 9, power lines are indicated by solid lines, and communications lines are indicated by dashed lines. Power may be transferred among the elements connected by the power lines, and data may be exchanged among the elements connected by the communications lines.

As shown in FIG. 9, the energy management system 100 may be connected to the power control module (PCS) 300 by a power line and may be connected to the PLC module 200 by a communications line to receive/transmit data from/to the PLC module 200.

The PLC module 200 may be connected to the energy management system 100, the PCS module 300 and a battery management system (BMS) 402 in the battery module 400 by communications lines. Further, the PLC module 200 may be connected to the PCS module 300 by power lines.

The PCS module 300 may be connected to the energy management system 100 and the battery module 400 by power lines and may be connected to uninterrupted power supply (UPS) 202 and a HMI 203 in the PLC module 200 by power lines. In addition, the PCS module 300 may be connected to the PLC controller 201 in the PLC module 200 and the BMS 402 in the battery module 400 by communications lines.

The battery module 400 may be connected to the PCS module 300 by a power line and may be connected to the PLC controller 201 in the PLC module 200 by a communications line.

Hereinafter, elements of the PLC module 200, the PCS module 300 and the battery module 400 and the specific operations of the elements will be described in detail.

The PLC module 200 may include a PLC controller 201, an uninterrupted power supply (UPS) 202, and a human machine interface (HMI) 203.

The HMI 203 may receive an input instruction from a user and may transmit the received input instruction from the user to the PLC controller 201. Further, the HMI 203 may output an image, e.g., status information on the energy storage management system based on a control instruction from the PLC controller 201. The HMI 203 may include, but is not limited to, a touch pad (not shown).

The UPS 202 may supply power to the PCS module 300 and the battery module 400 and may prevent the peak power is supplied to the PCS module 300 or the battery module 400 and may prevent power interruption.

The PLC controller 201 may receive a control instruction from the energy management system 100 which was transmitted from a system at an upper hierarchical level.

The PLC controller 201 may control the HMI 203 and the UPS 202 in the PLC module 200, the PCS module 300 and the battery module 400 in the lower hierarchical level in response to control instructions received from the energy management system 100.

In addition, the PLC controller 201 may receive an input instruction from a user via the HMI 203 in the PLC module 200. Upon receiving the input instruction from the user, the PLC controller 201 may control the UPS 202, the PCS module 300 and the battery module 400 based on the received input instruction from the user.

Further, the PLC controller 201 may receive battery status information on a battery 401 from the BMS 402 in the battery module 400 or the PCS module 300.

More specifically, the PLC controller 201 may receive the input instruction from a user, a control instruction from an upper hierarchical level and battery status information and may control the amount of power stored in the battery 401 via the PCS module 300 pursuant to the received instructions and information.

The PLC controller 201 in the PLC module 200 may be connected in parallel to a plurality of PCS modules and a plurality of battery modules controlled by the respective PCS modules, and may control the battery modules and the PCS modules.

The PCS module 300 may be made up of, but is not limited to, a stack of an AC distribution panel and a DC distribution panel.

The AC distribution panel 301 may receive AC power from the energy management system 100. More specifically, the AC distribution panel 301 may receive AC power from the energy management system 100 in response to a control instruction from the PLC controller 201.

The DC distribution panel 302 may convert the AC power received by the AC distribution panel 201 to DC power and may supply the converted DC power to the battery module 400. More specifically, the DC distribution panel 302 may supply DC power to the battery module 400 in response to a control instruction from the PLC controller 201.

The battery module 400 may include a plurality of batteries 401 and the BMS 402.

The batteries 401 may store the DC power supplied from the PCS module 300.

The BMS 402 may check the charge and discharge status of each of the batteries 401 at a predetermined cycle and may transmit the checked status to the PLC controller 201 in the PLC module 200 or the PCS module 300 at a predetermined cycle.

The BMS 402 may include a slave BMS (SBMS) and a master BMS (MBMS).

The SBMS may measure the voltage, current (or charge percentage) and temperature of each of cells included in the each of batteries 401. The SBMS may measure battery status such as the voltage, current (or charge percentage) and temperature of each of cells and may transmit the battery status to the MBMS.

The MBMS may create battery status information on each of the cells or the batteries based on information on the voltage, current (or charge percentage) and temperature of each of cells transmitted from the SBMS, and may control the charging and discharging of all of the batteries based on the information.

According to an embodiment of the present disclosure, a PLC system uses two CPUs and thus can provide control service more stably.

According to another embodiment of the present disclosure, the two CPUs share data by using MAC communications such that additional cost is not incurred and delay time can be saved.

According to an embodiment of the present disclosure, a PLC system uses two CPUs and thus can provide control service more stably.

According to another embodiment of the present disclosure, the two CPUs share data by using MAC communications such that additional cost is not incurred and delay time can be saved.

While particular embodiments of the present disclosure have been disclosed, it is to be understood that various different modifications and combinations are possible without departing from the gist of the present disclosure by those skilled in the art.

The embodiments disclosed herein have been presented by way of example only, and are not intended to limit the scope of the technical idea of the present disclosure.

The scope of protection sought by the present disclosure is defined by the appended claims and all equivalents thereof are construed to be within the true scope of the present disclosure.

What is claimed is:

1. A programmable logic controller (PLC) system comprising:
a control CPU including a first media access control (MAC) communications layer; and
a service CPU including a second MAC communications layer,
the control CPU configured to generate a first data for a control operation of the control CPU and a second data for a service operation of the service CPU, perform the control operation on a system at a lower hierarchical level based on the first data, and transmit the second data to the service CPU via the first MAC communications layer, and
the service CPU configured to generate the first data and the second data, perform the service operation except the control operation based on the second data and transmit the first data to the control CPU via the second MAC communications layer,
wherein the service CPU is connected to a service memory in which the first data to be transmitted to the control CPU is stored at a first predetermined location, and the control CPU acquires the first data stored in the first predetermined location of the service memory by a direct memory access (DMA) scheme, and
wherein the control CPU is connected to a control memory in which the second data to be transmitted to the service CPU is stored at a second predetermined location, and the service CPU acquires the second data stored in the second predetermined location of the control memory by the DMA scheme.

2. The PLC system of claim 1, wherein the service CPU receives the second data from the control CPU via the first and second MAC communications layers based on Ethernet scheme.

3. The PLC system of claim 2, wherein the service CPU comprises an Ethernet control module acquiring the second data.

4. The PLC system of claim 1, wherein the control operation comprises at least one of logic control, motion control, time synchronization control, communications control and input/output control operations.

5. The PLC system of claim 1, wherein the service operation is further configured to provide IT service and/or additional service.

6. The PLC system of claim 5, further comprising a third CPU configured to provide security service in the PLC system.

* * * * *